United States Patent [19]

Dines et al.

[11] 4,384,981
[45] May 24, 1983

[54] HYDROGENATION PROCESS UTILIZING NOVEL CATALYST

[75] Inventors: Martin B. Dines, Laguna Beach; Peter M. DiGiacomo, Mission Viejo; Kenneth P. Callahan, Costa Mesa, all of Calif.

[73] Assignee: Occidental Research Corporation, Irvine, Calif.

[21] Appl. No.: 295,341

[22] Filed: Aug. 24, 1981

[51] Int. Cl.³ .................. B01J 31/22; B01J 31/24
[52] U.S. Cl. ............................ 252/431 N; 252/429 R; 252/431 R; 252/431 C; 252/431 P; 564/305; 585/350; 585/400
[58] Field of Search ........... 252/429 R, 431 C, 431 N, 252/431 P, 431 R

[56] References Cited

U.S. PATENT DOCUMENTS

| | | | |
|---|---|---|---|
| 3,637,627 | 1/1972 | Short et al. | 252/431 P X |
| 3,787,459 | 1/1974 | Frankel | 252/431 C X |
| 3,832,404 | 8/1974 | Allum et al. | 252/431 P X |
| 3,847,997 | 11/1974 | Allen | 252/431 P X |
| 3,900,557 | 8/1975 | Strathdee | 252/431 P X |
| 4,059,542 | 11/1977 | Jennings et al. | 252/431 P |
| 4,276,195 | 6/1981 | Verkade | 252/429 X |
| 4,299,943 | 11/1981 | DiGiacomo et al. | 528/9 |

FOREIGN PATENT DOCUMENTS 10366 4/1980 European Pat. Off. .
10857 5/1980 European Pat. Off. .

Primary Examiner—Patrick Garvin
Attorney, Agent, or Firm—Robert J. Baran

[57] ABSTRACT

The instant invention relates to a novel hydrogenation catalyst comprising a composite of a Group VIII metal or Group VIII metal compound and a compound selected from the group consisting of compounds represented by the general formula $$M(O_3ZO_xR)_n$$

wherein M comprises a tetravalent metal, Z comprises a pentavalent atom, R is selected from the group consisting of hydrogen, organo radicals and mixtures thereof provided that at least a portion of said radicals comprise a moiety selected from the group consisting of pyridyl, allyl, anthranilic acid radicals and mixtures thereof; x is 0 or 1, and n is 2, provided that n is 1 when R is terminated with a tri- or tetra-oxy pentavalent atom. This catalyst is useful in hydrogenation processes which comprise contacting said catalyst with an unsaturated compound, said unsaturated compound comprising at least one unsaturated bond, e.g., a carbon-carbon bond, a carbon-nitrogen bond, a carbon-oxygen bond, or a nitrogen-oxygen bond, etc. at conditions sufficient to convert said unsaturated bond into a saturated bond. For example, benzonitrile may be hydrogenated to a mixture comprising benzylamine, toluene, and a benzylideneamino toluene by means of a hydrogenation catalyst comprising a composite of PdCl₂ and zirconium bis [2-(4'pyridyl)ethylphosphonate].

7 Claims, No Drawings

HYDROGENATION PROCESS UTILIZING NOVEL CATALYST

FIELD OF THE INVENTION

The instant invention relates to new catalysts which are useful in the hydrogenation of unsaturated bonds, such as carbon-carbon bonds, carbon-nitrogen bonds, carbon-oxygen bonds, etc.; for example, the hydrogenation of olefins including diolefins, etc.; aromatics; aldehydes, both saturated and unsaturated; edible fats and oils; and nitro compounds to obtain amines may be catalyzed by the novel catalyst.

BACKGROUND OF THE PRIOR ART

It is well known that various heterogeneous catalysts may be used to hydrogenate unsaturated compounds which comprise one or more unsaturated bonds. Most commercial heterogeneous catalysts, however, are poorly characterized materials which have a distribution of active sites which exhibit variability in their nature, activity, and selectivity.

Despite these drawbacks, there are often significant process advantages accrued when a heterogeneous catalyst is employed. Homogeneous catalysts, which offer uniform composition and reactivity, and often fewer by-products, can present difficulties in separating product from the catalyst (an especially important point if the catalyst is based on a precious metal) and may have increased energy requirements. The advantages of both modes of reaction would be offered if one would attach a homogeneous catalyst to an insoluble backbone, a process termed heterogenization.

Heterogenization of a homogeneously active catalyst is not a new idea; quite a bit of work has already been carried out on this concept, but the previous supports have most often consisted of chemically-modified inorganic and organic polymers. These materials often suffer from low chemical and thermal stability, (due to the reactivity of the support), have a variety of active sites (like a conventional heterogeneous catalyst) due to the geometric irregularity of the polymer, and often exhibit leaching of the catalyst into the product stream, affording a separation problem similar to that of homogeneous catalysis. The layered zirconium phosphonates and analogous compounds (especially the layered species) have been found to be suitable support materials for compositing with active hydrogenation catalysts selected from the group consisting of the metals of Group VIII of the Periodic Table of the Elements and salts and other compounds thereof. Although the Group VIII metals are preferred for hydrogenation activity, it is appreciated that the interaction between the support and metal as dealt with here would be applicable to hydrogenation active metals in other groups. The layered structure of such zirconium phosphonates and analogous compounds provide uniform catalytic sites, and may be chemically modified to minimize leaching. More demanding conditions could be applied without degradation of the support. In addition, the two-dimensional geometry of the interlayer space may result in an enhanced selectivity towards entering reactants or product formation.

BRIEF DESCRIPTION OF THE INVENTION

It has now been discovered that a novel hydrogenation catalyst comprising a composite of a Group VIII metal or Group VIII metal compound and a support selected from the group consisting of compounds represented by the general formula $$M(O_3ZO_xR)_n$$

wherein M comprises a tetravalent metal, Z comprises a pentavalent atom, R is selected from the group consisting of hydrogen and organo radicals provided at least a portion of such R groups comprise a moiety selected from the group consisting of pyridyl, allyl, anthranilic acid radicals and mixtures thereof, X is 0 or 1, and n is 2, provided that n is 1 when R is terminated with a tri- or tetra-oxy pentavalent atom, may be used in a novel process to hydrogenate unsaturated compounds having at least one unsaturated bond.

Z is preferably selected from the group consisting of members of Group V of the Periodic Table of the Elements having an atomic weight of at least 30; most preferably, Z is P. That is, the compound that is composited with the Group VIII metal or Group VIII metal salt will comprise a compound selected from the group consisting of compounds represented by the general formulae $$M(O_3PR)_2 \text{ or } M(O_3POR)_2$$

M is preferably a tetravalent metal ion selected from the group consisting of metals with approximately the same ionic radius as $Zr^{+4}$ (0.8 Å), e.g.

| | | | | | | | |
|---|---|---|---|---|---|---|---|
| $Zr^{+4}$ | 0.80Å | $Te^{+4}$ | 0.81 | $Pr^{+4}$ | 0.94 | $Mn^{+4}$ | 0.5 |
| $W^{+4}$ | 0.66 | $Sn^{+4}$ | 0.71 | $Pb^{+4}$ | 0.92 | $Ir^{+4}$ | 0.66 |
| $U^{+4}$ | 0.89 | $Si^{+4}$ | 0.41 | $Os^{+4}$ | 0.67 | $Hf^{+4}$ | 0.81 |
| $Ti^{+4}$ | 0.68 | $Ru^{+4}$ | 0.65 | $Nb^{+4}$ | 0.67 | $Ge^{+4}$ | 0.53 |
| $Th^{+4}$ | 0.95 | $Pu^{+4}$ | 0.86 | $Mo^{+4}$ | 0.68 | $Ce^{+4}$ | 1.01 |

Most preferably, M is Zr.

Most preferably, the above defined R group will be capable of coordinating with the Group VIII metal or the Group VIII metal salt, to provide stability against loss of the hydrogenation activity of the above composite. For the purposes of this disclosure the term "capable of coordinating" shall mean the ability to form either a covalent or ionic bond with the Group VIII metal or Group VIII metal compound.

This coordinative interaction may be one of four general types: Lewis base donor (exemplified by the pyridyl group); pi-bonding (as exemplified by the allyl group); chelating, and cation exchange (which are combined in the anthranilic acid group).

The Group VIII metal or Group VIII compound provides the hydrogenation activity in the above composite. Thus, active materials will be those that are known in the art as having suitable hydrogenation activity. For example, the Group VIII metals, such as cobalt, nickel, platinum, palladium, iron, ruthenium, osmium, rhodium iridium, and the salts and other compounds thereof may be utilized as the above Group VIII metal or Group VIII metal compound. As will be further discussed below, the support due to its unique structure provides an environment for obtaining unexpected advantages when used in combination with the Group VIII metal or Group VIII compound.

More specifically, the support is unique in providing a suitable environment for modification of the hydrogenation properties of Group VIII metal compounds, e.g., the compounds which are useful in the instant novel hydrogenation catalysts may exist in the form of layered structures, i.e., materials which exist in the form of sheets or slabs with a thickness of from 1 to more than 7 atomic diameters lined upon one another. In this structure relatively weak Van der Waals or hydrogen bonding occurs between the interlamellar basal surfaces in a direction perpendicular to the plane of the layers. In materials of this sort, guest molecules or ions such as the above Group VIII metals and Group VIII metal compounds may intercalate into the region between the layers. These materials may have properties which differ greatly from the starting layered compound. The compounds which are useful as a support in the instant hydrogenation catalysts can be further modified by the variation of the above-described R group. For example, R groups such as carboxylate, sulfonate, phosphonate, cyano, amino, alkenyl-containing groups, etc. can be utilized to further modify the hydrogenation properties of the instant catalysts.

The novel catalysts of the instant invention are especially useful in hydrogenation reactions, that is, the reduction of unsaturated bonds, such as carbon-carbon bonds, carbon-nitrogen bonds, carbon-oxygen bonds, etc. For example, the hydrogenation of olefins, including diolefins, etc; aromatics; aldehydes; edible fats and oils; and nitro compounds to obtain amines may be catalyzed by said catalysts. Preferably, $C_2$ to $C_{20}$ olefins, including both straight and branched chain olefins, $C_6$ to $C_{20}$ aromatics including condensed aromatics and $C_1$ to $C_{20}$ aldehydes may be hydrogenated with the catalysts of the instant invention. A particular hydrogenation process wherein the catalysts of the instant invention may be used is the conversion of benzene to cyclohexane.

Other specific hydrogenation processes which are within the scope of the instant invention, include the hydrogenation of (a) cyclohexene to obtain cyclohexane; (b) nitrobenzene to obtain aniline; (c) benzonitrile to obtain a mixture comprising benzylamine, toluene, and α-benzylideneaminotoluene; and (d) diphenylacetylene to obtain a mixture comprising cis-stilbene, trans-stilbene, and 1,2 diphenylethane.

The hydrogenation processes utilizing the catalysts of the instant invention are conveniently carried out at temperatures of from 25° C., to 250° C., preferably from 75° C. to 175° C., and at pressures of from atmospheric to 800 atm, preferably from atmospheric to 50 atm. Feed rates of from 0.2 to 1000 volumes per hour per volume of catalyst and hydrogen addition of from 2,000 to 5,000 standard cubic feet per barrel of feed may be used.

DETAILED DESCRIPTION OF THE INVENTION

1. The Support

The compound or support useful in preparing the instant novel hydrogenation catalyst will be selected from the group consisting of compounds represented by the formula $M(O_3ZO_xR)_n$. In the above formula N may equal 1 or 2, except that n is 1 when R is terminated by a tri- or tetra-oxy pentavalent atom. M represents a tetravalent metal ion selected from the group consisting of

| Zr | Te | Pr | Mn |
| W  | Sn | Pb | Ir |
| U  | Si | Os | Hf |

-continued

| Ti | Ru | Nb | Ge |
| Th | Pu | Mo | Ce |

Z is an atom selected from the group consisting of the members of Group V of the Periodic Table of the Elements having an atomic weight of at least 30; R is selected from the group consisting of hydrogen and organic radicals provided that at least a portion of said R groups comprise a moiety selected from the group consisting of pyridyl, allyl, anthranilic acid radicals and mixtures thereof; and X varies from 0 to 1. More preferably, said compositing compound will be selected from the group consisting of the compounds represented by the general formula $M(O_3PR)_2$, or $M(O_3POR)_2$.

The above compounds may be prepared by a process which comprises reacting, in a liquid medium, at least one acid compound, i.e. an organo-substituted, pentavalent atom containing acid, having the formula $$[(HO)_2OZO_x]_kR$$

wherein k is 1 when n is 2 and k is 2 when n is 1, with at least one of the above tetravalent metal ions to precipitate a solid in which the molar ratio of pentavalent atom to tetravalent metal is about 2 to 1, the pentavalent atom is covalently bonded to R, and when X equals 1, R is linked to the pentavalent element z through oxygen.

It should be noted that X will be 0 when the starting material for preparing the compound is represented by the general formula

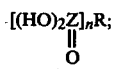

wherein n is 1 or 2, e.g.,

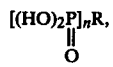

i.e., phosphorus acid or organophosphonic acids. When the starting material is represented by the general formula

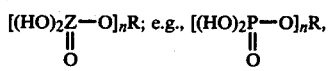

i.e., organophosphoric acids or phosphoric acid, X will be 1. If a mixture of such starting materials are used, X will vary from 0 to 1 in accordance with the ratio of the starting materials.

The tetravalent metal M, and the pentavalent atom Z, may be selected in accordance with the desired support or compositing properties for the Group VIII metal or Group VIII metal compound by those skilled in the art. However, M is preferably Zr and Z is preferably P.

R is selected from the group consisting of hydrogen radicals, organo acyclic, alicyclic, heteroacyclic, heterocyclic, aromatic groups, and mixtures thereof, provided at least a portion of the R groups comprise the above noted moieties.

Preferably, R will be chosen to enable the composite compound to achieve a layered structure, whereby the Group VIII metal or Group VIII metal compound may be intercalated within such layers. Thus, the size of the R may be important, since very bulky R groups may disrupt such layering.

In general, with phosphorus as the pentavalent atom, the organo group should occupy no more than about 24 $Å^2$ for proper spacing. This limitation is imposed by the basic crystal structure of zirconium phosphate. A spacing of 5.3 Å is known to exist between zirconium atoms in the zirconium plane of a crystal, a total area of about 24 $Å^2$ is known for the space bounded by zirconium atoms. It follows that any group anchored on each available site cannot have an area much larger than the site area and maintain the layered structure.

This limitation can be avoided through the use of a combination of larger and smaller groups, i.e., mixed components. If some of the sites are occupied by groups which have an area much less than about 24 $Å^2$ and still maintain the layered structure of the compound.

The cross-sectional area which will be occupied by a given organo group can be estimated in advance of actual compound preparation by use of CPK space filling molecular models (Ealing Company) as follows: A model for the alkyl or aryl chain and terminal group is constructed, and it is situated on a scaled pattern of a hexagonal array with 5.3 Å site distances. The area of the group is the projection area on this plane. Some areas which have been determined by this procedure are listed in Table I.

TABLE I

| Moiety | Minimum Area ($Å^2$) | Moiety | Minimum Area ($Å^2$) |
|---|---|---|---|
| Alkyl chain | 15 | Isopropyl | 22.5 |
| Phenyl | 18 | t-butyl | 25 |
| Carboxyl | 15 | Chloromethyl | 14 |
| Sulfonate | 24 | Bromoethyl | 17 |
| Nitrile | 9 | Diphenyl-Phosphino | 50 (approx.) |
| Morpholinomethyl | 21 | Mercaptoethyl | 13.5 |
| Trimethylamino | 25 | | |

Note that the bulk of the above described moieties must also be included when calculating the correct R group size for attaining the preferred layered structure in the support.

One process for the formation of the support compound is a metathesis reaction conducted in the presence of a liquid medium receptive to the tetravalent metal ion at a temperature up to the boiling point of the liquid medium, preferably from ambient to about 150° C. and, more preferably, to about 100° C. at the pressure employed.

While water is the preferred liquid medium when phosphorus is the pentavalent atom, as most of the phosphorus acid compounds are hygroscopic, an organic solvent, such as ethanol can be employed, where water interferes with the reaction or where another pentavalent atom containing acid is utilized in preparing the support. There need only be provided a solvent for the pentavalent atom containing acid since the tetravalent ion can be dispersed as a solid in the solvent for slow release of the metal ion for reaction with the acid, e.g., the organophosphorus acid compound. If it has a sufficiently low melting point, the pentavalent atom containing acid can serve as a solvent. Typically, the liquid medium is the liquid medium in which the pentavalent metal containing acid is formed.

To illustrate with acids, wherein phosphorus is the pentavalent atom, for complete consumption of the tetravalent compound, the amount of acid employed should be sufficient to provide two moles of phosphorus per mole of tetravalent metal. An excess is preferred. Mixtures of one or more organophosphorus acids and phosphorus acid and/or phosphoric acid, may be reacted to provide an inorganic polymer diluted in respect of the organo groups in proportion to the amount of phosphorus or phosphoric acid employed.

Reaction is virtually instantaneous at all temperatures leading to precipitation of layered crystalline, semi-crystalline or amorphous solid compounds.

R will also be selected in accordance with the properties of the hydrogenation catalyst which is desired. For example, the R group may be selected for its ability to coordinate with the Group VIII metal or Group VIII metal compound through the allyl, pyridyl, or anthranilic acid radicals. The R groups may include heteroatoms suitable for assisting in or providing for additional coordination. For example, R groups containing amino, cyano, sulfono, mercapto, halide, carboxy, ether, etc. groups may be utilized.

2. The Group VIII Metal or Group VIII Metal Compound

The Group VIII metal or Group VIII metal compound is the active hydrogenation moiety in the instant novel catalyst. The Group VIII metal and Group VIII metal compounds may be selected from the group consisting of a nickel, cobalt, platinum, palladium, rhodium, iridium, iron, ruthenium, osmium. These materials are active either as the compound or the metal form. For example, various complex salts including halogen salts of Group VIII metals are useful hydrogenation moieties. Other examples of useful Group VIII metal salts include carboxylates, nitrates, sulfates, $\beta$-diketonates, etc.

The Group VIII metal may also be provided as a complex wherein the Group VIII metal exists in the zero valence state and, thus, is not correctly labeled as a salt. For example, carbonyl complexes, and various other complexes such as phosphines, nitriles, isonitriles, etc. of Group VIII metals are known hydrogenation moieties.

In general, any known hydrogenation catalyst, either heterogeneous or homogeneous may be composited with the above support compounds to provide novel hydrogenation catalysts.

Preferably, the Group VIII metal is selected from the group consisting of palladium and platinum as either the metal or salt form. Most preferably, the hydrogenation moiety is palladium metal or a palladium chloride salt.

3. The Hydrogenation Catalyst

The above support compound may exist as a layered structure. It is possible to intercalate guest species in between such layers. As is noted herein, intercalation is affected by the nature of the region between the various layers. Group VIII metals and Group VIII metal compounds which are active hydrogenation moieties are suitable for intercalation between the layers of the above described support compounds. Such Group VIII metals and Group VIII metal compounds may form bonds with the appended Group R.

It is noted that at least a portion of said R groups may be covalently bonded to pentavalent elements in adjacent layers. That is, the otherwise two dimensional structure of the layered compounds may be at least partially three-dimensional (by use of certain organo-substituted, pentavalent atom containing acids wherein k is 2, i.e. compounds represented by the formula

The three dimensional structure has been found to substantially prevent the Group VIII metal and the Group VIII metal compound from leaching into the reactant feed stream. See for example, U.S. patent application Ser. No. 295,340, entitled "Hydroformylation Process Utilizing Novel Catalyst," filed in the names of K. Callahan, P. DiGiacomo and M. Dines, on same data herewith.

It is also possible to convert an otherwise two dimensional layered compound into a three-dimensional structure by reacting at least two R groups on adjacent layers with a bifunctional cross linking agent to achieve the three dimensional structure. Such reaction can be effected throughout the interior surface of said layers or only at the edges.

The Group VIII metal or compound is preferably intercalated into the layers of a two-dimensional layered compound prior to conversion of such two-dimensional layered compound into a three-dimensional structure.

Preferably, the instant novel hydrogenation catalysts will comprise from about 0.1 to about 40, weight %, more preferably from about 1 to about 20, weight %, of said Group VIII metal.

4. Preparation of the Hydrogenation Catalyst

The above support components may be contacted with a solution comprising the active hydrogenation moiety, i.e., the Group VIII metal or Group VIII metal compound or a precursor thereof, for a time sufficient to enable such hydrogenation moiety to intercalate into the layers of such support compound. The solvent for dissolving said hydrogenation moiety or precursor may be aqueous or nonaqueous, since in general the support compound is stable to both types of solvents. The composites are unstable in the presence of aqueous alkali; therefore, solutions having a pH of at most 8 should be utilized for preparing the instant novel hydrogenation catalyst.

The intercalated support may be separated from said Group VIII metal or Group VIII metal compound or precursor containing solution and said excess solvent removed by drying at a temperature of from about 25° to about 200° C. for a time sufficient to remove substantially all of said excess solvent. Said drying may take place in air or an inert atmosphere or under vacuum. The composite may be activated for hydrogenation by contacting said dried catalyst with a reducing atmosphere, e.g., hydrogen gas, at room temperature or an elevated temperature of from about 25° C. to about 200° C., preferably from about 50° C. to about 150° C., for a time sufficient to convert said Group VIII metal compound or precursor into an active hydrogenation moiety, e.g., a Group VIII metal.

Alternatively, the instant hydrogenation catalyst, wherein said catalyst comprises a Group VIII metal or compound having hydrogenation activity, intercalated between the layers of the above support, whereby said catalyst is characterized as resistant to the egress of said Group VIII metal or compound from between said layers, may be prepared by a process which comprises the steps of:

(a) intercalating a Group VIII metal or compound having catalytic activity, or a precursor thereof, into the layers of the above described compound, wherein said compound is characterized as a layered crystalline material comprising contiguous layers, each of said layers being spaced from and substantially unconnected to its neighboring layer to thereby allow access of said Group VIII metal or compound (or precursor thereof) into the interior of said crystalline material, and (b) crosslinking said layers to thereby connect said contiguous layers to neighboring layers and hinder egress of said Group VIII metal or compound (or precursor thereof) from the interior of said crystalline material.

Preferably the crosslinking is effected by means of a bis acid compound such as a bis acid having the general formula

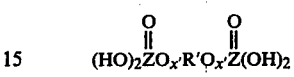

wherein Z is as described above, x' is 0 or 1, and R' is an organo radical such as the organo radicals described above. More preferably Z is P and x' is 0.

The crosslinking may be carried out by contacting the solid intercalated compound with the bis acid in solution, e.g. an aqueous solution, for a time and at conditions sufficient to effect exchange of some of the interlayer R or O—R groups of the intercalated compound for the bis acid. Conveniently the contacting may be effected at ambient temperature and pressure.

The crosslinked catalyst may be dried and activated as described above.

The following are specific examples of the instant invention. There is no intention that the scope of the instant invention be limited to the examples, since there are many variations thereon which are within the ordinary skill of the art.

EXAMPLE 1

Synthesis of Anthranilic Acid-Substituted Zirconium Phosphonate

Dimethyl 2-bromoethyl phosphonate was reacted with a 50% excess of anthranilic acid in ether solution; the product was treated with weak base to afford the free acid, the phosphonate ester groups were hydrolyzed off and the resulting material was reacted with aqueous $ZrOCl_2$.

The resulting greenish-tinted solid exhibited an infrared spectrum which has a weak carbonyl stretching vibration at 1620 cm$^{-1}$. Its x-ray powder pattern showed a broad reflection corresponding to an interlayer spacing of 18.03 Å, in reasonable agreement with the distance expected for this material. The elemental analysis was fairly close to the expected value: Calcd for $C_{18}H_{20}N_2O_{10}P_2Zr$: C, 37.43; H, 3.44; N, 4.85; Found: C, 31.41; H, 4.35; N, 3.73.

EXAMPLE 2

Exchange of Pd(II) Into the Layered Anthranilic Acid Compound

An aqueous suspension of anthranilic acid-substituted zirconium phosphonate was reacted with an aqueous solution of $PdCl_2$. The solution pH was maintained at a value of 3 by occasional addition of base. The reaction was continued at 33° for 26 hrs, and the resulting product was separated by filtration. The initial weight of the solid was 5.777 g; after reaction and drying it weighed 6.024 g, corresponding to a 4.1% loading of Pd(II); a loading equivalent to one Pd per zirconium atom would be 14.8 wt% Pd. Anal.: Found, Pd, 3.42.

EXAMPLE 3

Preparation of Layered Allyl Compound

A solution of 0.0417 mol of allyl phosphonic acid in 6:1 tetrahydrofuran-water (60 ml) was prepared. To this was added a solution of 3.69 g (0.0209 mol) $ZrOCl_2$ in 10 ml water. A precipitate rapidly formed. This mixture was refluxed for one hour and heated overnight just below reflux. After cooling to room temperature, the reaction mixture was filtered, and the solid collected was washed with water, acetone and then ether. After drying for an hour at 100° C., the solid was found to weigh 5.703 g (83% yield).

EXAMPLE 4

Exchange of Pd(II) Into the Layered Allyl Compound

To a suspension of 1 g (2.76 mmol) allyl zirconium phosphonate in 150 ml of deionized water was added 1.80 g (5.52 mmol) $K_2PdCl_4$. The latter reagent immediately dissolved, and the suspension was allowed to stir at room temprature for 3.5 days. The resulting blue-green solution was filtered, giving rise to a deep orange filtrate and a gray solid which, after drying, weighed 1.14 g. Incorporation of a $PdCl_2$ group at every unsaturation site would have given a product weighing 1.54 g. Anal. Calcd: Pd, 5.5; Cl, 3.6. Found: Pd, 3.51; Cl, 2.37.

EXAMPLE 5

Preparation of Layered Pyridyl Compound

Zirconium 2-(4'pyridyl)ethylphosphonate: The pyridylalkylphosphonates have, of course, a basic nitrogen in the substituent. It is expected that protonation of the ring and the attendant solvation will impede the reaction with metal ion. Direct reaction of 2-(4'pyridyl) ethylphosphonic acid with zirconyl chloride in aqueous solution below pH 1.5 does not form a solid product. If one adds hydroxide to an aqueous solution of the pyridylphosphonyl acid and zirconyl chloride, solid product begins to form in the pH 1.5 to 2.0 range. As one increases the pH, more product forms. If one allows the pH to get too high (>7), hydrolysis of zirconium ion to form $ZrO_2$ competes with the desired reaction. At pH 4.8, one gets about 70% of the theoretical yield with a relatively small amount of hydrolysis of the metal ion. A number of preparations have been carried out in this pH range under somewhat different conditions of pH control. Generally, the crystallinity was poor to moderate in terms of the sharpness of the x-ray diffraction pattern.

The pH as well as the method of pH control significantly influences the sharpness of the x-ray pattern and the amount of contamination by $ZrO_2$ formed from competing hydrolysis of zirconium ion. The data in Table 2 summarizes the influence of pH on the crystallinity of the material.

TABLE 2

Effect of pH and Control on the Crystallinity of $Zr(O_3P—CH_2CH_2—C_5H_4N)_2$

| Entry | Prep. | Conditions | XRD |
|---|---|---|---|
| 1 | 1528-120 | pH 4.8; adjusted down from 7 | very broad. only d = 19Å observed |
| 2 | 1528-151 | pH 4.8; adjusted up from 1 | very broad. d = 18.6Å hint of 4Å peak |
| 3 | 1529-2A | pH 5; aqueous pyridine buffer | Some definition: d = 18.8; d = 9 and 6Å weak; 4Å envelope definite |
| 4 | 1528-175 | pH 4.8. Co-addition of $Zr^{+4}$ and $^-OH$ so as to control pH | about same as in pyridine buffer |
| 5 | 1529-15 | pH 3.5. Co-addition of $Zr^{+4}$ and $^-OH$ so as to control pH | sharper. d = 18.6 definite peaks at d = 9 and 6A 4A envelope not resolved |

As evident from Table 2, control of the pH during reaction leads to product with a sharper x-ray pattern than does adjustment of the pH after mixing of the reactants. (compare entries 3 and 4 and 1 and 2). It would appear that adding hydroxide cocurrent with the addition of zirconyl chloride is the method of choice for the preparation, thus keeping pH fluctuations to a minimum. However, one can achieve similar results with the use of a buffer such as pyridine to control the pH. Further, it appears that lower pH also favors crystallinity (compare entry 4 and 5). This is probably due to a more rapid recrystallization at the lower pH. There is a more rapid solution concentration of both phosphoric acid and zirconium ion at the lower pH.

The quality of the material in terms of elemental analysis is also pH dependent—although here it appears that avoiding high pH extremes even for short periods of time is the critical factor. Table 2 presents elemental analysis data for these materials.

TABLE 3

Elemental Analysis of Pyridyl Compounds

| Entry | Cmpd | % C | % P | % N | % Zr |
|---|---|---|---|---|---|
| 1 | 1528-120 | 15.79 | 0 | 2.80 | — |
| 2 | 1528-151 | 22.5 | 8.50 | 3.67 | 24.75 |
| 3 | 1528-2A | 28.22 | 12.03 | 4.16 | — |
| 4 | 1528-175 | 28.13 | 11.94 | 5.11 | — |
| 5 | 1529-15 | 26.50 | 12.54 | 4.47 | 17.54 |
| Calc for $Zr(O_3PCH_2CH_2—C_5H_4N—Cl)_2$ | | 31.46 | 11.61 | 5.24 | 17.04 |

EXAMPLE 6

Exchange of Pd(II) Into the Layered Pyridyl Compound

In a manner similar to those described above, a suspension of the pyridyl-substituted zirconium phosphonate was reacted with a solution of bis(benzonitrile) palladium chloride, $(C_6H_5CN)_2PdCl_2$. Anal. Calcd for $Zr(O_3PCH_2CH_2C_5H_4N).2PdCl_2$: Pd, 16.66; Cl, 11.10. Found: Pd, 3.1; Cl, 10.1. The high amount of Cl in the product indicates that a substantial number of the pyridyl groups exist in their protonated form, e.g. $—C_5H_4NH^+Cl^-$; it is not obvious whether this quaternization occurred during the palladium incorporation or was present in the starting material.

EXAMPLE 7

Catalytic Hydrogenation Studies

All hydrogenation studies were carried out in Parr mini-reactors of 450 or 600 ml capacity constructed of 316 stainless steel and having maximum working pressures of 2000 psig. A typical experiment is outlined below.

The glass liner of the bomb was charged with 20 ml (0.19 mol) cyclohexene and 0.2 g of Pd(II)-loaded anthranilic acid catalyst of Example 2, and the bomb was sealed and flushed three times with $H_2$ before it was taken to the working pressure of 325 psig. The bomb temperature was raised to 80° over a 30-min period, at which time the pressure gauge read 400 psig (calcd for no reaction: 385 psig). The gauge pressure dropped 60 psi after an hour of reaction at that temperature, and it was left stirring overnight. The next morning the pressure was found to have dropped to 200 psi, and the reaction was terminated. Gas chromatographic analysis indicated that all of the cyclohexene had been converted to a mixture of 96% cyclohexane and 4% of an unidentified product having a long retention time.

The hydrogenation of cyclohexene with the Pd catalyst of Examples 4 and 6 was also carried out in a similar manner. Details and results of our experiments are presented in Table 1. It can be seen from these data that the anthranilic acid catalyst is much less catalytically active than the other two materials.

TABLE 3
HYDROGENATION OF CYCLOHEXENE[a]

| Catalyst | Turnover Number (moles converted/mole metal) | Time | Product (%) |
|---|---|---|---|
| Anth. acid | 17.2 | 180 min | Cyclohexane (96) |
| Pyridyl | 72.4 | 45 min | Cyclohexane (100) |
| Allyl | 241 | 12 min | Cyclohexane (100) |

[a]Initial pressure 325 psig; reaction temperature 80° C.

It is noted that an induction period during which the rate of gas uptake increases, is obvious during the first few minutes of the above reactions. After this stage a nearly steady gas uptake rate is observed up to about 80% of the reaction. Complete hydrogenation of the cyclohexane is observed after 20 min. reaction time. The observed induction period indicates that some time is needed for the hydrogenation reaction to get started and attain its maximum rate. Such an effect may be ascribed to the need to chemically alter the charged "catalyst" to the truly active species. While not wishing to be bound by theory, this latter material could be a Pt(II) hydride olefin group, and the induction period could correspond to the time necessary for all the sites to be so transformed. The induction period could also correspond to the time necessary to effect reduction of the Pd(II) sites to metallic Pd.

No substantial changes in the elemental composition of the catalysts were observed when data on material before and after catalytic runs were compared. However, a significant change in the infrared spectrum of the Pd(II) loaded allyl catalyst before and after reaction was observed. Comparison of the intensity of the C=C stretch band of the uncoordinated allyl groups (1635 cm$^{-1}$) band with that of the material recovered from a hydrogenation run shows that there is much less unsaturation in the recovered catalyst. It thus appears that this material catalyzes the hydrogenation of its own sites of unsaturation. This process may occur via a "hydrogen spill-over" effect such as observed in heterogeneous systems where adsorbed hydrogen diffuses over the catalytic surface. A more conventional mechanism would involve the intermediacy of an allyl-palladium dihydride which could undergo either hydride or palladium migration to an adjacent site.

It is noted that all three catalysts changed color from light tan to black when subjected to hydrogenation reactions. It is, therefore, possible that the palladium was being reduced to the metallic state under the reaction conditions, and the actual catalytically active species may be metallic palladium.

Representative Electron Spectroscopy for Chemical Analysis (ESCA) scans show that the shift in Pd binding energy which occurs after the catalyst has been used for a hydrogenation is consistent with a large amount of metallic palladium being present in the recovered catalysts; although small shoulders in the spectra at Pd(II) binding energies indicate that this conversion was not complete.

EXAMPLE 8

Hydrogenation of Other Unsaturated Compounds

The palladium (II)-loaded pyridyl substituted zirconium phosphonate of Example 6 was tested for catalytic hydrogenation ability toward several other substrate molecules. The results are summarized below.

(a) Nitrobenzene

The relevant reaction is shown in the following equation

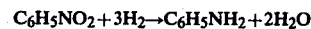

$$C_6H_5NO_2 + 3H_2 \rightarrow C_6H_5NH_2 + 2H_2O$$

The palladium-loaded pyridyl catalyst gave a 40% yield of aniline after 39 min. at 125° C. with 325 psig initial $H_2$ pressure. Uptake of gas was evident before the reaction temperature was reached. This behavior is similar to that observed with conventional heterogeneous catalysts. An induction period similar to that seen in the hydrogenation of cyclohexene is apparent. Carbon monoxide was found to inhibit this reaction.

(b) Diphenylacetylene

The relevant reactions are shown in equations below. the first step, hydrogenation of the triple bond to form an olefin, can give two isomeric products, designated cis or trans depending on the orientation of the substituents about the double bond. These molecules can be further hydrogenated to the saturated product as also shown in such equations

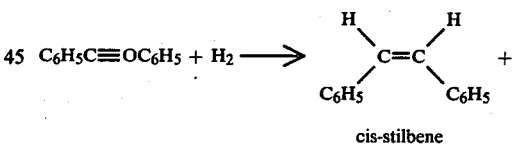

cis-stilbene

trans-stilbene

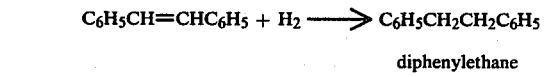

diphenylethane

The palladium-loaded pyridyl catalyst of Example 6 hydrogenated diphenylacetylene under only 50 psig pressure of $H_2$: an ethanol solution of the substrate was 100% converted to a product mixture consisting of 80.7% cis-stilbene, 16.1% trans-stilbene, and 3.2% 1,2-diphenylethane. The low pressure used in this experiment made it difficult to monitor the course of the reaction, for the pressure gauge on the Parr bomb is not very sensitive or accurate in this regime. No pressure decrease was observed when the reaction mixture was stirred at room temperature for 3 hrs. and upon warming to 80° C. the pressure increased to 60 psig (the ideal gas law predicts 59 psig if no reaction occurred). No pressure increase was observed when the temperature was next raised to 100° C., and it remained steady on holding the reactor at this temperature for 1 hr. Upon cooling to room temperature the pressure was found to be 35 psig; it thus appears that the reaction occurred during the warming from 80° C.

(c) Benzonitrile

The palladium-loaded pyridyl catalyst reacted with benzonitrile under pressurized hydrogen to afford a mixture of products. The initial hydrogen pressure (at room temperature) was 525 psig, and upon warming to 100° C. over a period of 23 min. the pressure dropped to 410 psig. The final pressure, after cooling back to room temperature, was 120 psig. The elapsed time was 167 min. The resulting liquid product was analyzed by gas chromatography and gc-mass spectroscopy. Three products were identified: benzylamine (26%), toluene (32%), and α-benzylideneaminotoluene (37%). No benzonitrile remained. These products arose as shown in the equations below.

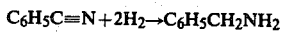

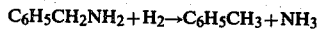

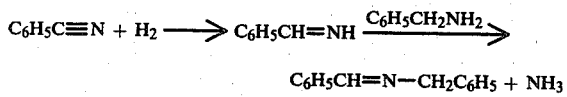

It is noteworthy that the unsaturated imide, α-benzyliideneaminotoluene, and not dibenzylamine, its hydrogenation product, was detected; dibenzylamine is frequently a major product in the heterogeneous hydrogenation of benzonitrile. This observation indicates that the above catalyst is able to denitrogenate substrates without saturating them with hydrogen.

(d) Benzene

Solid palladium-loaded pyridyl-substituted zirconium phosphonate catalyst (1.934 g; 0.063 mol Pd) of example 6 was added to 8.42 g (0.108 mol) benzene in the Parr reactor. After the vessel was sealed it was pressurized with H$_2$ to 375 psig at room temperature and warmed to 100° C.; the pressure rose to 465 psig. After 133 min. at this temperature the pressure had decreased to 340 psig, and on cooling to room temperature the gauge registered 270 psi. Analysis of the product liquids by gas chromatography after the catalyst was filtered off showed a composition of 54% cyclohexane and 46% benzene. (Proton nmr analysis indicated the cyclohexane content to be 48%).

What is claimed is:

1. A hydrogenation catalyst comprising a composite of a Group VIII metal or Group VIII metal compound and a support selected from the group consisting of compounds represented by the general formula $$M(O_3ZO_xR)_n$$

wherein M comprises a tetravalent metal, Z comprises an atom selected from the group consisting of members of Group V of the Periodic Table of the Elements having an atomic weight of at least 30, R is selected from the group consisting of hydrogen radicals, organo acyclic, alicyclic, heteroacyclic, heterocyclic, aromatic groups and mixtures thereof, provided that at least a portion of said radicals comprise a moiety selected from the group consisting of pyridyl, allyl, anthranilic acid radicals and mixtures thereof, x is 0 or 1, and n is 2, provided that n is 1 when R is terminated with a tri- or tetra-oxy pentavalent atom.

2. The catalyst of claim 1 wherein M is selected from the group consisting of Zr, W, U, Ti, Th, Te, Sn, Si, Ru, Pu, Pr, Pb, Os, Nb, Mo, Mn, Ir, Hf, Ge, Ce and mixtures thereof.

3. The catalyst of claim 2 wherein said moiety is coordinated with said Group VIII metal or Group VIII metal salt.

4. The catalyst of claim 3 wherein said Group VIII metal comprises palladium.

5. The catalyst of claim 4 wherein M comprises Zr and Z comprises P.

6. The catalyst of claim 1 wherein said support is characterized as having a layered structure comprising two or more layers, each layer being separated from the adjacent layer by from about 6 Å to about 50 Å.

7. The catalyst of claim 6 wherein Group VIII metal or Group VIII metal compound is intercalated between said layers.

* * * * *